Patented May 10, 1949

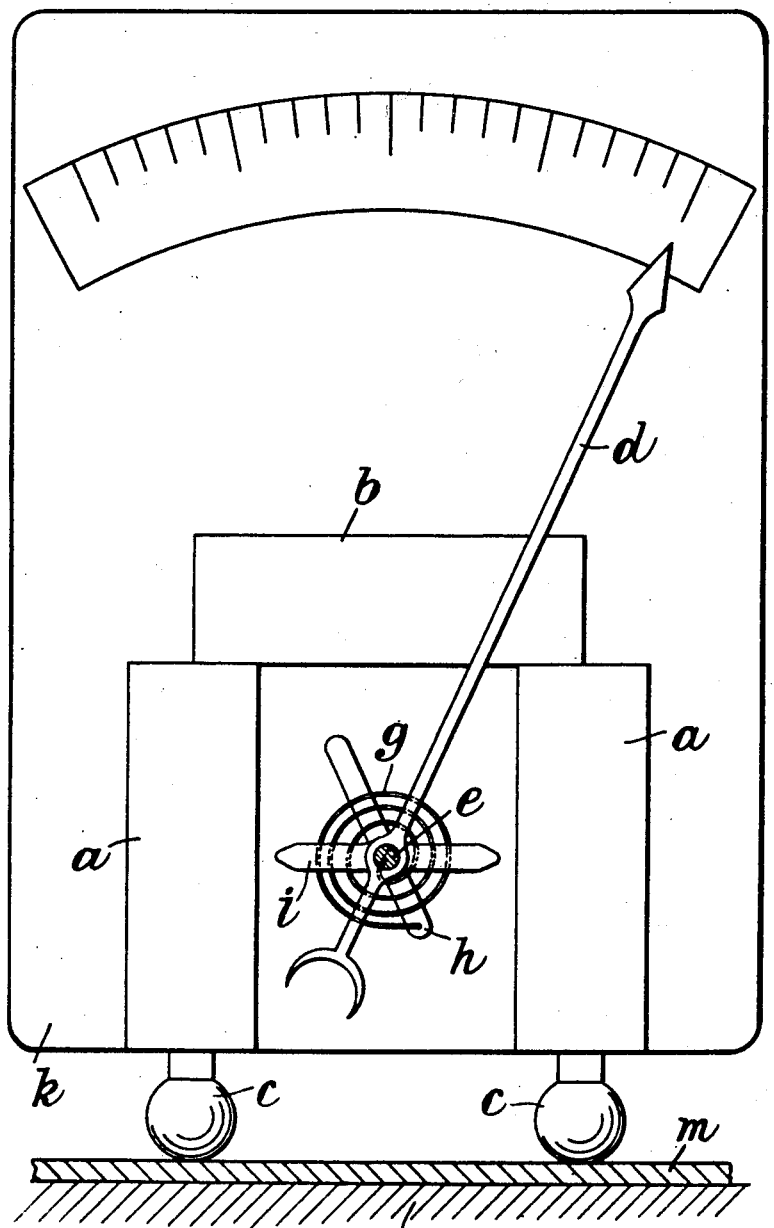

UNITED STATES PATENT OFFICE 2,469,476

2,469,476

MAGNETIC TESTING APPARATUS

John Carrington Sellars, Manchester, England, assignor to East Lancashire Chemical Company Limited, Manchester, England, a British company Application January 13, 1948, Serial No. 1,917

2 Claims. (Cl. 175—183)

This invention has for its object to provide a simple and efficient instrument for measuring the width of an air gap or clearance which may result for example from an irregularity in a machined surface or the thickness of a layer of non-magnetic material such as the electro-plating on a ferrous base. Other applications of the instrument will be hereinafter referred to.

An instrument in accordance with this invention comprises a U-shaped magnet, which may be in one piece or built up from separate soft iron bars and a bar magnet bridge between them, mounted on a non-magnetic base, the ends of the limbs of the magnet being formed so that they can be used as test prongs, a small bar magnet or soft iron bar pivotally mounted equidistantly between the limbs of the U-shaped magnet, a pointer secured to the bar magnet or soft iron bar, and spring means for restraining the rotation thereof.

A device in accordance with the invention is illustrated in the accompanying drawing.

The U-shaped magnet consists of two soft iron bars $a$ and a bar magnet $b$, each bar $a$ having at its lower end a rounded soft iron test prong $c$. A pointer $d$ is carried by a spindle $e$, mounted at right angles to the base $k$ in suitable bearings, to which is attached one end of a spiral spring $g$, the other end of the spring being connected to an adjustable support $h$. A small bar magnet or soft iron bar $i$ is fixed to the pointer, which moves over a scale $o$. The parts are mounted on a panel or base $k$ of non-magnetic material.

The magnetic flux of the main magnet $b$ flows in one direction down one bar $a$ and back along the other. The magnetic circuit is completed across the air gap between the arms in which the small magnet $i$ swings. The magnetic flux flowing between these bars, $a$, produces a force of attraction to the pivoted magnet $i$ towards the inside surfaces, the angle encompassed depending upon the amount of magnetic flux flowing across the gap and the degree of tension on the spring $g$. If the test prongs $c$ of the magnet are placed on a ferrous surface, a weakening of the flux across the gap takes place and the force of attraction to the pivoted magnet is less pronounced. Thus if an air gap of varying magnitude is created between the test prongs and the ferrous surface, the degree of rotation of the magnet and spindle will vary in direct proportion to the magnitude of the air gap. The air gap may be substituted by a coating $m$ of any non-magnetic material on the ferrous surface $n$. If therefore, the pointer attached to the spindle is suspended over a suitably calibrated scale, a direct reading of gap width or thickness of coating may be ascertained. By a simple adjustment of the tension of the spiral spring $g$, the instrument may be set to give accurate readings on bases having varying magnetic properties.

The instrument may be employed for a variety of services such as for detecting the movement of an apparently stationary object of ferrous composition from a predetermined position. In this way movement in space of a machine could be detected and measured. Irregularities in the surface of a machined ferrous material could likewise be detected by moving the material and test prongs relatively to one another in the plane in which accuracy is required. The instrument is further applicable for testing the permeability factor of magnetic materials, or for detecting a change in effective permeability of material subjected to an alternating magnetic field, or for determining the proportions of magnetic and non-magnetic materials in mixtures. It may also be used for testing the strengths of U-shaped or bar magnets, and for detecting flaws, such as air locks and cracks, and variations in diameter of iron wires.

What I claim is:

1. An instrument for measuring thicknesses of layers of non magnetic materials, and so forth, comprising a substantially U-shaped magnet having limbs consisting of separate soft iron bars and an adjustable bar magnet bridge between them, the ends of the limbs of the magnet being substantially spherical to act as test prongs, a non-magnetic base on which the magnet is mounted, a magnetic rotor pivotally mounted equidistantly between the limbs of the U-shaped magnet, a pointer secured to the magnetic rotor and spring means for restraining the motion thereof.

2. An instrument for measuring thickness of layers of non-magnetic materials, and so forth, comprising a substantially U-shaped magnet having limbs consisting of separate soft iron bars and an adjustable bar magnet bridge between them, the ends of the limbs of the magnet being shaped to act as test prongs, a non-magnetic base on which the magnet is mounted, a magnetic rotor pivotally mounted equidistantly between the limbs of the U-shaped magnet, a pointer secured to the magnetic rotor and spring means for restraining the motion thereof.

JOHN CARRINGTON SELLARS.

REFERENCES CITED

The following references are of record in the file of this patent:

UNITED STATES PATENTS

| Number | Name | Date |
| --- | --- | --- |
| 508,827 | Knap et al. | Nov. 14, 1893 |
| 1,000,938 | Le Pontois | Aug. 15, 1911 |
| 1,270,100 | Ballman | June 18, 1918 |